United States Patent [19]

Gail

[11] 3,972,381
[45] Aug. 3, 1976

[54] SENSOR ARRANGEMENT FOR HARVESTER OF STALK-TYPE ROW CROP

[75] Inventor: Josef Gail, Aichach-Unterwittelsbach, Germany

[73] Assignee: Maschinenfabrik Fahr Aktiengesellschaft, Gottmadingen, Germany

[22] Filed: July 17, 1975

[21] Appl. No.: 596,918

[30] Foreign Application Priority Data

July 17, 1974 Germany............................ 2434396

[52] U.S. Cl................................. 180/79.1; 172/6; 56/10.2
[51] Int. Cl.² ........................................ B62D 5/04
[58] Field of Search............... 180/79.2 R, 79.1, 79; 56/10.2, 208; 172/5, 6

[56] References Cited
UNITED STATES PATENTS

| | | | |
|---|---|---|---|
| 2,981,355 | 4/1961 | Rabuse | 180/79.1 |
| 3,038,544 | 6/1962 | Richey | 172/5 |
| 3,208,535 | 9/1965 | Fischer | 180/79.1 X |
| 3,857,455 | 12/1974 | Ernst | 180/79.2 R |
| 3,908,345 | 9/1975 | Oni | 56/208 |

Primary Examiner—Robert R. Song
Assistant Examiner—R. Schrecengost
Attorney, Agent, or Firm—Karl F. Ross; Herbert Dubno

[57] ABSTRACT

A harvester displaceable along the ground in a transport direction determined by a steering mechanism itself operated by a controller has a sensor formed of a pair of sensor arms pivotal on the harvester about pivot axes spaced apart transverse to the harvester transport direction. These arms are biased into a position extending normally toward and in line with each other and have inner ends which overlap so that displacement of the chassis of the harvester along the ground will bring crop into engagement with these arms and deflect them backwardly. Each of the arms is connected to a potentiometer and these potentiometers are wired in series such that as the one arm is deflected backwardly the resistance of its potentiometer increases and as the other arm is deflected backwardly the resistance of its potentiometer decreases. These potentiometers are connected in series and to the automatic controller of the device which only generates a deviation signal and feeds it to the steering mechanism when the sum of the resistances of the two potentiometers varies from a predetermined set point.

6 Claims, 5 Drawing Figures

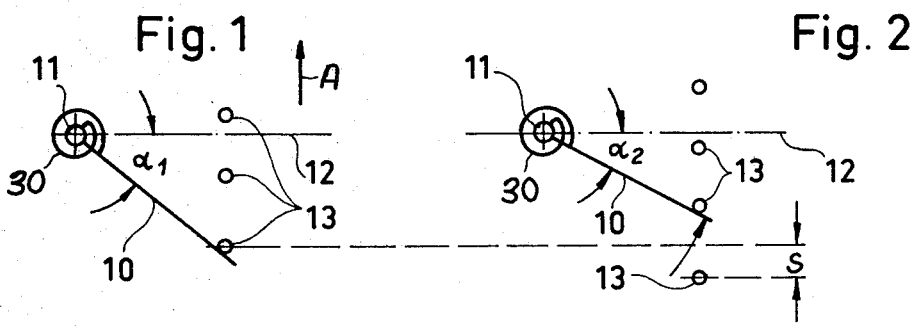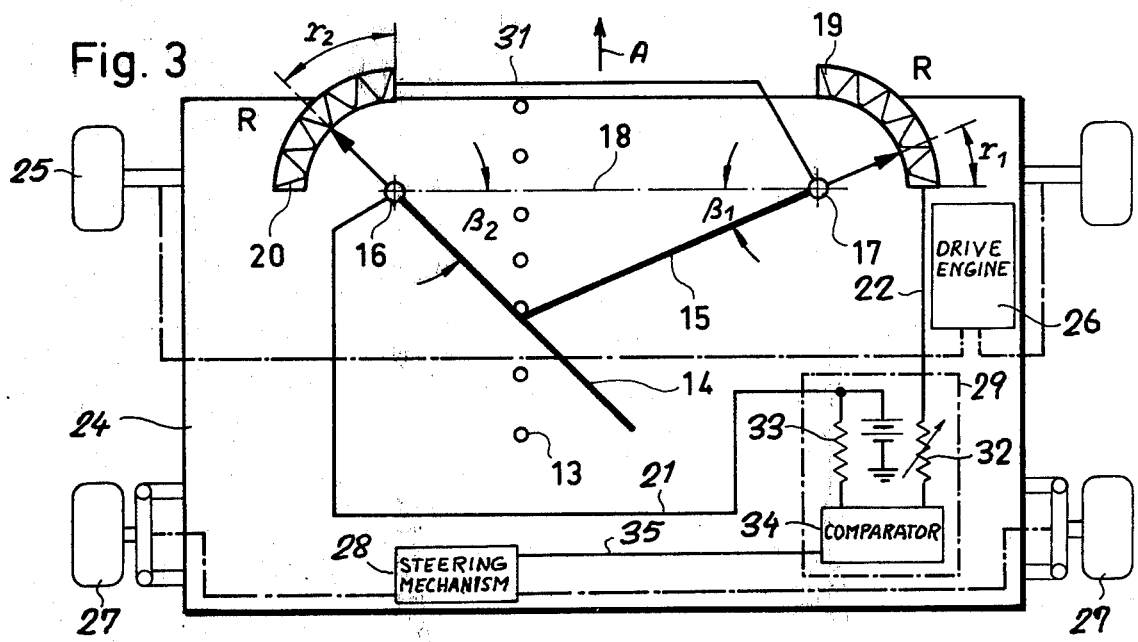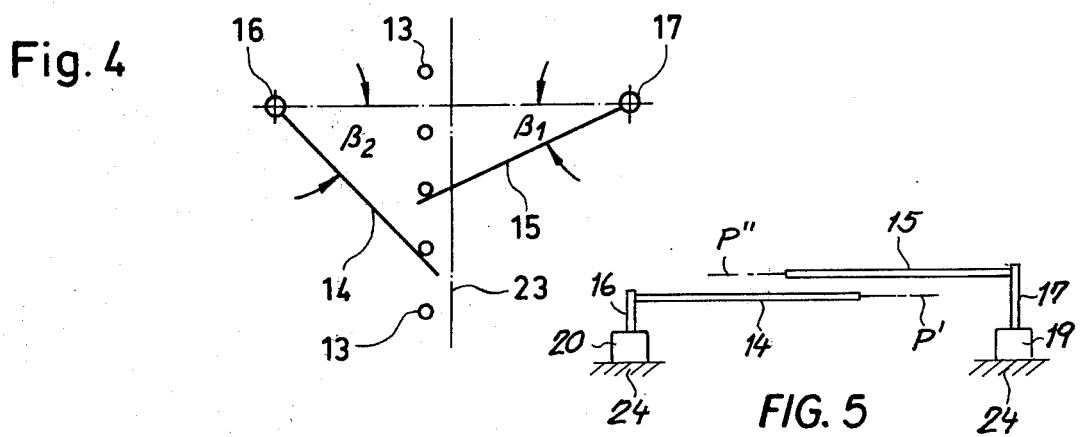

SENSOR ARRANGEMENT FOR HARVESTER OF STALK-TYPE ROW CROP

CROSS REFERENCE TO RELATED APPLICATIONS

This application is related to my copending patent application Ser. No. 496,743 filed Aug. 12, 1974 and itself related to commonly assigned patent application Ser. No. 421,494 filed Dec. 3, 1973.

FIELD OF THE INVENTION

The present invention relates to a harvester for a stalk row crop. More particularly this invention concerns an arrangement for detecting the lateral position of a row of stalk crop relative to the chassis of such a harvesting machine.

BACKGROUND OF THE INVENTION

In my above-referenced copending patent application I disclose a harvester provided with sensor means ahead of the chassis in the transport direction for detecting the edge of a swath cut in a standing crop and for generating an output corresponding to the position of this edge relative to the chassis. Actuation means independent of the steering element and connected to the sensor means receives this output and controls the guide wheels of the chassis in accordance with this output. Further means is provided which is responsive to inclination of the ground under the chassis for altering the output so as to bias the chassis directionally in the uphill direction. Also in accordance with that invention means is provided responsive to the displacement speed of the chassis in the transport direction for altering this output so as to reduce the steering response with increasing speed and vice versa.

My earlier application further discloses feedback means responsive to the position of the steering wheels relative to the transport direction of the chassis for altering the output so as to eliminate this output when the guide wheels have made a response adequate to compensate for the alignment of the chassis with the swath, even though this compensation has not yet moved the chassis fully into the proper position along the edge of the swath.

This arrangement has shown itself to be extremely useful for crops such as wheat, oats, and the like, but is relatively ineffective when a stalk-type row crop, such as corn, is being harvested.

It is known to harvest such a stalk-type row crop using a feeler arm mounted at the front end of the chassis. This arm is pivotal about a vertical axis and normally extends perpendicular to the transport direction of the chassis so that as the chassis moves in a forward direction the arm is deflected backward by the row crop to an extent generally proportional to the position of the row transverse to the direction of displacement of the chassis. A pickoff device is connected to this arm and generates an output corresponding to the angular position of the arm, this output being used by the automatic controller operating the steering mechanism of the chassis.

Such a system has the disadvantage that even when the stalks are perfectly equispaced in the row the arm will oscillate back and forth through a predetermined angle as the chassis is displaced along the ground, the arm sliding off one stalk and then swinging forward against the next stalk under the effect of the spring urging it into a normal position perpendicular to the transport direction. Thus it is conventional in such systems to make the automatic controller relatively insensitive to this oscillation, providing it with an integrator that produces an output only when the average signal changes over a relatively long period of time. The obvious disadvantage of such a system is that the steering response is relatively sluggish.

When a gap in the row being felt by the sensor arm appears the system produces an output which is wholly false. Thus it is not uncommon when a large gap appears in the row for the harvester to veer so much off its course that it can ride over and destroy part of an adjoining row, and will necessitate manual takeover of the steering operation in order to get back on course.

An attempt to cure this false reading has been to provide a pair of sensor arms which detect the row being harvested and two locations spaced apart in the direction of travel of the machine. Both of these arms are pivoted on axes lying to one side of the row so that should one of the arms detect a gap in the row the other arm will continue to ride on the stalk. The two signals from the two arms are averaged together so as to reduce the likelihood of a false steering reaction to a simple gap in the row.

Such systems at their best are relatively insensitive so as not to be able to precisely guide the chassis along a row of stalk-type crop. Thus the operator of such harvesters must usually be on the lookout and ready to take over the steering of the machine whenever he notices that a gap in the crop appears or the machine is slowly going off course by itself.

OBJECTS OF THE INVENTION

It is therefore an object of the present invention to provide an improved harvester for stalk-type row crop.

Another object is the provision of an improved crop sensor which will not generate a false output when a gap appears in the row being felt.

Yet another arrangement is to provide such a system whose output signal remains relatively constant so that the operator of the machine need not pay particular attention to the steering in order to be able to take over the case of misdirection of the apparatus by the sensor.

SUMMARY OF THE INVENTION

These objects are attained according to the present invention in a row stalk crop harvester of the above-described general type having a pair of sensor arms pivotal on the chassis about respective pivot axes fixed thereon and spaced apart thereon transverse to the transport direction of the chassis. Means is provided for pivotally biasing each of the arms to a normal position extending toward the pivot axis of the other arm. In addition a generator is provided on each of the arms which has an impedance that varies with the extent of deflection of the respective arm backwardly by the crop from the normal position perpendicular to the transport direction. The impedance of one of the generators increases on such backward deflection of the respective arm and the impedance of the other arm decreases on backwad deflection of the respective arm. Means is provided for connecting the generators in series and to the automatic controller for the steering mechanism of the harvester so as to feed into this controller a signal indicating the lateral position of the row being sensed relative to the chassis.

According to another feature of this invention the pivot axes for the sensor arms both lie in a plane generally pependicular to the direction of travel of the chassis. This allows the sensor arms to both ride on the same stalk at the same time. Thus should there be a gap in the crop both of the sensor arms will swing forwardly to engage the next stalk, thereby increasing the impedance of the one generator and decreasing the impedance of the other, so that the output signal will remain at the same level.

This arrangement allows for an output to be produced which varies very little, and which therefore allows for very precise steering of the harvester. In addition relatively long sensor arms may be used so that a relatively wide spacing can be left between the two pivot axes and the row may curve sharply and still lie between these axes and, therefore, serve to guide the harvester.

According to the present invention the output impedance, which is the sum of the impedances of the two generators, is compared to a set-point impedance corresponding to straighthead displacement of the chassis. This comparison creates a difference signal which is fed to the steering mechanism and serves to move the chassis toward the right or toward the left when the actual-value signal, corresponding to the impedances of the two generators, differs from the set point. The system according to the present invention is very advantageous in arrangements where a hydraulic steering system is used having a solenoid valve controlling the steering. Since the signal coming from the sensor arms will only vary from the set point when a steering correction is needed, this solenoid valve will only be actuated when strictly necessary and, therefore, will have an increased service life.

BRIEF DESCRIPTION OF THE DRAWING

The above and other objects, features, and advantages will become more readily apparent from the following, reference being made to the accompanying drawing in which:

FIGS. 1 and 2 are top diagrammatic views illustrating the operation of the system according to the present invention;

FIG. 3 is a top view, mainly in diagrammatic form, of a harvester according to the present invention;

FIG. 4 is a diagram illustrating the operation of the system of FIG. 3; and

FIG. 5 is a front view of a portion of the system of FIG. 3.

SPECIFIC DESCRIPTION

The arrangement shown in FIGS. 1 and 2 has a sensor arm 10 made of glass-fiber reinforced synthetic-resin material and pivoted on a vertical axis 11 next to a row of stalks 13. A torsion spring 30 normally urges the arm 10 into the position indicated by dot-dash line 12, which is perpendicular to a normal direction of displacement A. As the chassis carrying the pivot 11 is displaced in this direction A the arm 10 will be deflected back through an angle $\alpha_1$ as its outer end contacts the stalks 13 which are between 12 and 15 cms apart.

As the chassis continues to move through a distance $s$ in the direction A the end of the arm 10 will slip off one stalk 13 and on to the next stalk 13, thereby closing the angle to an angle $\alpha_2$ substantialy smaller than the angle $\alpha_1$. With most prior art systems this variation is taken into account by averaging the angle, and only when it departs from this average is a course correction made.

The arrangement shown in FIG. 3 has a pair of arms 14 and 15 pivotal on respective axes 16 and 17 on a chassis 24. These axes 16 and 17 lie in a common plane 18 perpendicular to the direction A and to the row of stalks 13 along which the chassis 24 is displaced. The chassis 24 has front drive sheels 25 connected to an engine 26 and rear steering wheels 27 connected to a steering mechanism 28 itself connected to a controller 29. The arms 14 and 15 are pivotal as shown in FIG. 5 in respective planes P' and P'' which are horizontal and spaced vertically apart so that the two arms 14 and 15 may engage a common stalk 13 without striking one another.

The arms 15 and 16 are provided at their respective axes 16 and 17 with potentiometers 20 and 19 as shown on pages 44 ff. of SERVOMECHANISM PRACTICE by AHRENDT and SAVANT (McGraw, Hill: 1960). The right-hand end of the left-hand potentiometer 20 is connected by a wire 31 to the wiper of the right-hand potentiometer 19 whose right-hand end is connected to a line 22 to the controller 29. The wiper of the left-hand potentiometer 20 is connected to a line 21 of the controller 29 to that these potentiometers 19 and 20 are connected in series and in such a manner that the resistance $r_1$ of the potentiometer 19 will decrease as the angle $\beta_1$ defined between the arm 15 and the plane 18 decreases whereas the resistance $r_2$ of the potentiometer 20 will increase as the angle $\beta_2$ increases.

Thus taking the following values:

R = overall resistance of each potentiometer 19 and 20, $r_1$ = instantaneous resistance of potentiometer 19, $r_2$ = instantaneous resistance of potentiometer 20, $\beta_1$ = deflection angle of sensor arm 15, and $\beta_2$ = deflection angle of sensor rod 14 the following relationships can be drawn:

$$r_1 = R \times \beta_1/90°, \text{ and}$$

$$r_2 = R - (R \times \beta_2)/90°.$$

This gives the following sum of $r_1 + r_2$:
$$R + \beta_1/90° + R - (R \times \beta_2)/90°,$$

which can be reduced as follows:

$$R + \frac{R \times \beta_1 - R \times \beta_2}{90°} = R + \frac{R}{90°}(\beta_1 - \beta_2).$$

Drawing out the factor R/90° as a constant K it can be seen that the sum of two instantaneous resistances $r_1$ and $r_2$ is directly proportional to the difference between the deflection angles $\beta_1$ and $\beta_2$ of the rods 15 and 14. Since when $\beta_1$ equals $\beta_2$ the second part of the equation drops out the actual value, equal to the sum of the resistances $r_1$ and $r_2$, will be equal to R which therefore is the set point. In this condition the machine will be set so as to move straight ahead.

If it is desired as shown in FIG. 4 to guide the apparatus with the row offset from the exact center 23 between the two axes 16 and 17 a resistor 32 in series with the resistors 19 and 20 is set so as to automatically add something to the actual-value impedance.

It is also possible to space the axes 16 and 17 in the direction A so as to allow them to be mounted in the same plane.

With the system according to the present invention the sum of the resistances $r_1$ and $r_2$ will also equal R when the two angles $\beta_1$ and $\beta_2$ are the same. Only a deviation from this equality will cause the sum of the two resistances $r_1$ and $r_2$ to vary from the value R. Thus even if there is a gap in the row of crop the two arms 14 and 15 will jointly swing together forwardly by the same angular amount so as to keep the output signal relatively even, assuming that otherwise the machine continues to ride in the direction of the row.

The sum of resistances $r_1$ and $r_2$ is compared to a set-point resistor 33 of resistance R in a comparator 34 of the controller 29. A deviation signal produced by this comparator is fed via a conductor 35 to the steering mechanism 28 to effect the necessary course correction.

I claim:

1. In a row stalk crop harvester having a chassis displaceable along the ground in a transport direction determined by a steering mechanism itself operated by an automatic controller, the improvement comprising:
   a pair of sensor arms pivotal on said chassis about pivot axes fixed thereon and spaced apart thereon transverse to said direction;
   means for pivotally biasing each of said arms into a normal position extending toward the axis of the other arm, whereby forward displacement of said chassis in said direction with a row between said axes deflects said arms backwardly by engagement of said crop with said arms;
   generator means connected to each of said arms and having an impedance varying with the extent of deflection of the respective arm backwardly by said crop from said normal position, the impedance of one of said generator means increasing on such backward deflection of the respective arm and the impedance of the other arm decreasing on backward deflection of the respective arm; and
   means for connecting said generator means in series and to said controller for feeding to same an input indicating lateral position of said row relative to said chassis.

2. The improvement defined in claim 1 wherein said axes lie generally in a plane perpendicular to said direction.

3. The improvement defined in claim 2 wherein said generators are potentiometers.

4. The improvement defined in claim 3 wherein said arms are each formed of glass-fiber reinforced synthetic-resin material.

5. The improvement defined in claim 4 wherein said means for biasing includes a pair of springs each engaged between said chassis and a respective one of said arms.

6. The improvement defined in claim 4 wherein said axes are to either side of said row and said arms are both engageable with a common stalk in said row.

* * * * *